United States Patent
Doering et al.

(10) Patent No.: US 7,448,983 B2
(45) Date of Patent: Nov. 11, 2008

(54) SYSTEM AND METHOD FOR UTILIZING ESTIMATED DRIVER BRAKING EFFORT

(75) Inventors: Jeff Doering, Canton, MI (US); David Bidner, Livonia, MI (US); Shane Elwart, Ypsilanti, MI (US); Gopichandra Surnilla, West Bloomfield, MI (US); Yonghua Li, Windsor (CA)

(73) Assignee: Ford GLobal Technologies, LLC, Dearborn, MI (US)

( * ) Notice: Subject to any disclaimer, the term of this patent is extended or adjusted under 35 U.S.C. 154(b) by 238 days.

(21) Appl. No.: 11/145,043

(22) Filed: Jun. 3, 2005

(65) Prior Publication Data

US 2005/0272560 A1 Dec. 8, 2005

Related U.S. Application Data (60) Provisional application No. 60/577,780, filed on Jun. 7, 2004.

(51) Int. Cl.
*B60W 10/06* (2006.01)
*B60W 10/18* (2006.01)
(52) U.S. Cl. .................. 477/183; 477/185; 477/203
(58) Field of Classification Search ............... 477/118, 477/183, 185, 187, 203, 204; 701/86
See application file for complete search history.

(56) References Cited

U.S. PATENT DOCUMENTS

| | | | |
|---|---|---|---|
| 5,319,555 A | 6/1994 | Iwaki et al. | |
| 5,428,531 A | 6/1995 | Hayafune | |
| 5,562,571 A | 10/1996 | Maruyama et al. | |
| 5,651,752 A | 7/1997 | Wakahara et al. | |
| 6,009,852 A | 1/2000 | Akabori | |
| 6,287,237 B1* | 9/2001 | Graf et al. | 477/94 |
| 6,394,069 B1 | 5/2002 | Kondo | |
| 6,405,587 B1 | 6/2002 | Livshiz et al. | |
| 6,600,988 B1 | 7/2003 | Da et al. | |
| 6,625,535 B2 | 9/2003 | Han et al. | |
| 2001/0037793 A1* | 11/2001 | Robichaux et al. | 123/339.19 |
| 2002/0107106 A1 | 8/2002 | Kato et al. | |
| 2004/0055569 A1* | 3/2004 | Matthews et al. | 123/399 |
| 2005/0056475 A1* | 3/2005 | Roberts | 180/165 |

* cited by examiner

*Primary Examiner*—Sherry Estremsky
*Assistant Examiner*—Edwin A Young
(74) *Attorney, Agent, or Firm*—Allan J. Lippa; Alleman Hall McCoy Russell & Tuttle, LLP (57) ABSTRACT

A method for controlling an engine of a vehicle operated by a driver may comprise detecting actuation of a braking device of the vehicle by the driver; calculating a parameter indicative of an actual amount of braking effort by said driver based on vehicle conditions; and adjusting an engine operating parameter based on said parameter. The method can adjust a number of cylinders carrying out combustion, fuel cut operation, a level of powertrain output torque (positive, and/or negative), and/or other engine parameters.

15 Claims, 5 Drawing Sheets

SYSTEM AND METHOD FOR UTILIZING ESTIMATED DRIVER BRAKING EFFORT

CROSS-REFERENCE TO RELATED APPLICATION

This application is based upon and claims the benefit under 35 U.S.C. § 119(e) of the following U.S. provisional patent application, which is incorporated herein by reference in its entirety for all purposes: Ser. No. 60/577,780, filed Jun. 7, 2004.

FIELD

The field of the disclosure relates to engine and power train control utilizing an estimated driver braking effort to improve vehicle drivability.

BACKGROUND

Engine and transmissions typically are controlled to provide a driver with requested operation. This is based in large part upon the driver actuated accelerator (gas) pedal. However, information regarding a driver's intention can also be gathered from actuation of the brake pedal.

For example, driver braking information can be used in transitioning from a positive power train output torque (engine driving the vehicle) to a negative power train output torque (vehicle driving the engine) to reduce potential transmission lash during the transition. In one approach (Da et al., U.S. Pat. No. 6,600,988), the duration of brake actuation is utilized. However, whether the driver is actuating the brake significantly, or only slightly, may represent significantly different situations. For example, if a driver is only slightly actuating the brake, albeit for a long period of time, more power train braking than desired may be provided.

Braking information can also be used to control the transmission shifting. For example, in one example approach (Han et al., U.S. Pat. No. 6,625,535), a determined driver braking intent is utilized to shift the transmission. However, transmission shifting in a transmission with a limited number of gears may have reduced control resolution to provide the driver with expected drivability. Furthermore, the approach described by Han et al. may produce a degraded estimate of braking intent at low vehicle speeds, which may result in undesirable transmission shifting.

The inventors herein have recognized the above-mentioned disadvantages and have developed an alternative approach. Further, the inventors herein have advantageously utilized information regarding the driver's braking in entering and/or controlling a deceleration fuel shut-off mode.

SUMMARY

At least some disadvantages of prior approaches may be overcome by a method for controlling an engine of a vehicle operated by a driver, the method comprising:

detecting an amount of actuation of a braking device of the vehicle by the driver; and adjusting a number of cylinders carrying out combustion as said amount of actuation varies.

By adjusting a number of cylinders carrying out combustion as an amount of brake actuation varies, it may be possible to provide increased fuel cut operation, while at the same time providing the driver to improved drivability that better matches expected results. Further, if increased power train braking can be utilized, this may also lead to reduced brake wear.

Note that there are various ways to detect an amount of actuation of a braking device by the driver, such as measuring a driver applied force in the brake pedal, estimating actual driver braking based on vehicle operating parameters, measuring brake fluid pressure, combinations thereof, or other approaches. Further, note that there are various ways to adjust a number of cylinders carrying out combustion, such as by discontinuing fuel injection to one or more cylinders (e.g., all cylinders), deactivating one or more intake and/or exhaust valves of the engine, or others.

However, other disadvantages of prior approaches may be overcome by a method for controlling a power train of a vehicle operated by a driver, the method comprising:

detecting a level of actuation of a braking device of the vehicle by the driver;

adjusting the power train to transition from providing positive torque driving the vehicle to negative torque braking the vehicle as said level of actuation varies By transitioning the power train to provide engine braking as a level of brake actuation varies, it may be possible to provide better drivability response than previously available. For example, it may be possible to distinguish between light brake effort over a long period and higher brake effort over a short period, thereby providing better vehicle response.

Still other disadvantages of prior approaches may be overcome by a method for controlling an engine of a vehicle operated by a driver, the method comprising:

detecting actuation of a braking device of the vehicle by the driver;

calculating a parameter indicative of an actual amount of braking effort by said driver based on vehicle conditions; and adjusting an engine operating parameter based on said parameter indicative of an actual amount of braking effort by said driver based on vehicle conditions.

By adjusting the engine based on an amount of driver braking effort, it may be possible to provide finer power train braking that is more responsive to what the driver expects. In this way, improved drivability may be achieved.

Note that the transmission or other parameters can also be adjusted based on calculated braking efforts as well.

BRIEF DESCRIPTION OF THE DRAWINGS

FIGS. 4-7 are graphs illustrating operation according to an example embodiment, and more specifically.

DETAILED DESCRIPTION

Figures 1, 2:
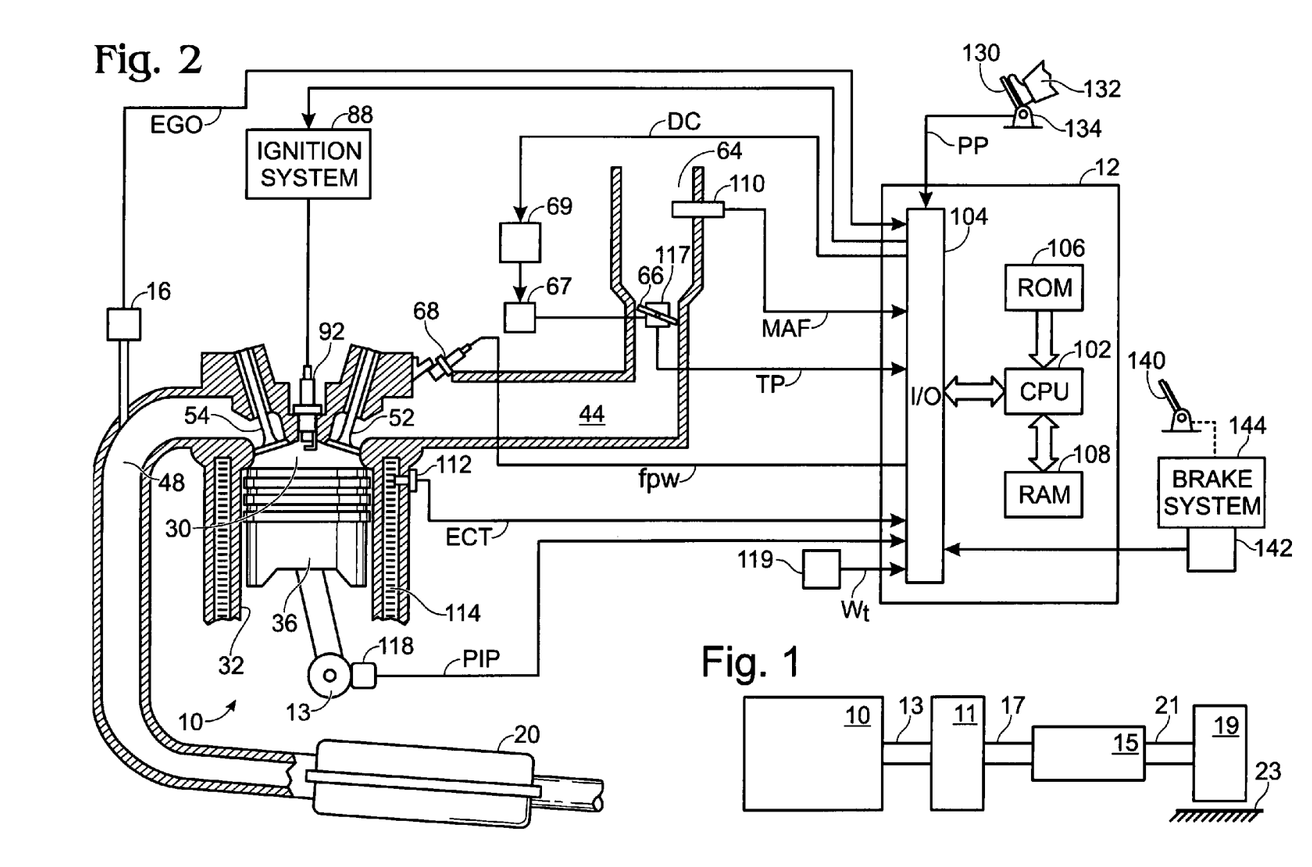
FIGS. 1-2 are block diagrams of an embodiment wherein the invention is used to advantage.

Referring to FIG. 1, internal combustion engine 10, further described herein with particular reference to FIG. 2, is shown coupled to torque converter 11 via crankshaft 13. Torque converter 11 is also coupled to transmission 15 via transmission input shaft 17. Torque converter 11 has a bypass clutch, which can be engaged, disengaged, or partially engaged.

When the clutch is either disengaged or partially engaged, the torque converter is said to be in an unlocked state. Transmission 15 comprises an electronically controlled transmission with a plurality of selectable discrete gear ratios. Transmission 15 also comprises various other gears such as, for example, a final drive ratio (not shown). Transmission 15 is also coupled to tire 19 via axle 21. Tire 19 interfaces the vehicle (not shown) to the road 23. In a preferred embodiment, transmission 15 has the following driver selectable options: park (P), reverse (R), neutral (N), driver (D), and low (L). The driver selects these positions via a transmission lever. In this preferred embodiment, the lever is known as the PRNDL lever, corresponding to the different options. In particular, in park or neutral, transmission 15 does not transmit torque from the transmission input to the output. In drive, a transmission controller can control transmission to select any available forward gear ratios. In reverse, a single reverse gear is selected. In low, only a lower set of forward gear ratios can be selected by the electronic controller. Those skilled in the art will recognize, in view of this disclosure, various other types of transmission levers with different sets of options that can be used with the present invention. For example, there can be low 1 and low 2 options. Also, the transmission lever may be located on a steering column or between driver and passenger seats.

Internal combustion engine 10 comprises a plurality of cylinders, one cylinder of which is shown in FIG. 2. Electronic engine controller 12 controls Engine 10. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributor less ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17; and a profile ignition pickup signal (PIP) from Hall effect sensor 118 coupled to crankshaft 13 indicating and engine speed (N).

Continuing with FIG. 2, accelerator pedal 130 is shown communicating with the driver's foot 132. Accelerator pedal position (PP) is measured by pedal position sensor 134 and sent to controller 12. Further, brake pedal 140 is also shown coupled to a brake system 144 having a brake sensor 142. Brake sensor 142 can be a two position pressure switch that indicates brake engagement or disengagement, or a pressure sensor that provides an indication of braking level.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 3A:
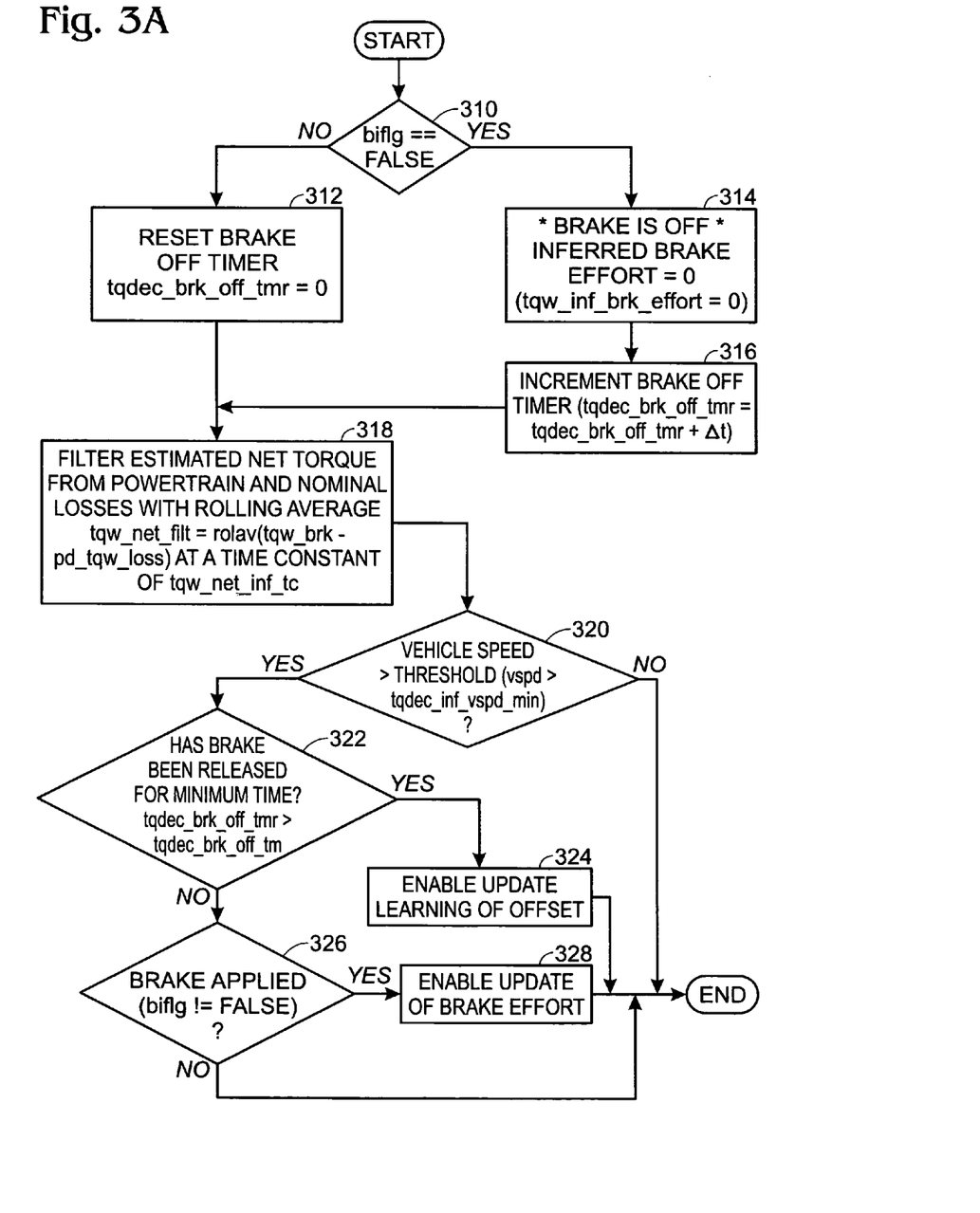
FIGS. 3A-3B are high-level flow charts of various operations.
Figure 3B:
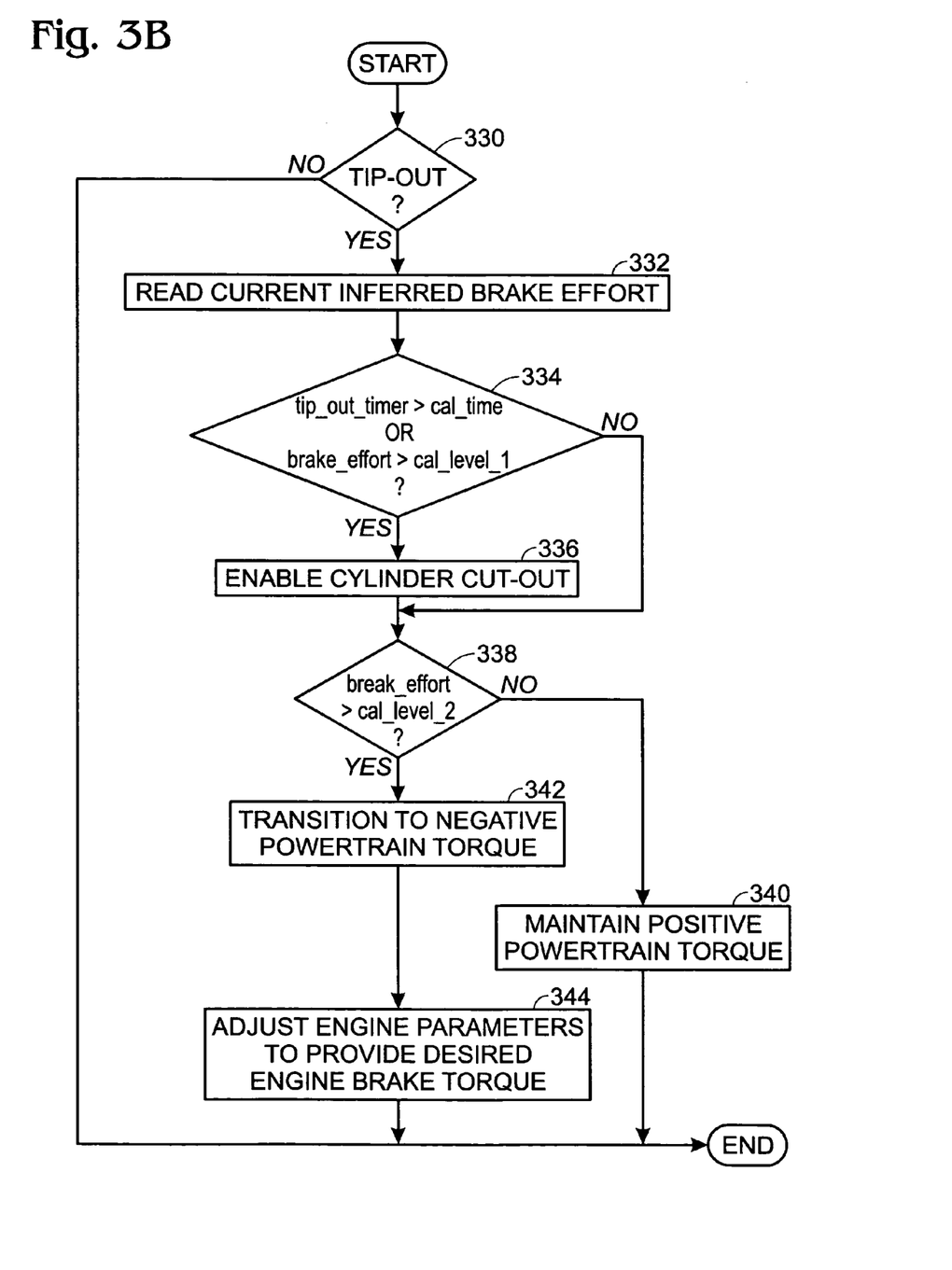

FIGS. 3A-3B describe example routines that may be carried out by controller 12. Further, the control routine included herein can be used with various engine configurations, such as those described above and/or below. As will be appreciated by one of ordinary skill in the art, the specific routine described below in the flowchart(s) may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing may not necessarily be required to achieve the features and advantages of the example embodiments of the invention described herein, but may be provided for ease of illustration and description. Although not explicitly illustrated, one of ordinary skill in the art will also recognize that one or more of the illustrated steps or functions may be repeatedly performed depending on the particular strategy being used. Further, the flowchart(s) graphically represents code to be programmed into the computer readable storage medium in controller 12, for example.

In general terms, FIG. 3 includes an example approach for estimating actual driver braking effort applied via its effect on the vehicle speed, and other conditions. Because most vehicles have at least a brake switch (and very few have brake pedal position or master cylinder pressure sensors, which could be used if present), in one example an algorithm may infer driver braking demand. This example may use a model of nominal vehicle running losses (pd_tqw_loss) and vehicle mass, along with an estimate of wheel torque from the power train (tqw_brk). In steady-state and nominal conditions, the inferred brake effort may be calculated as proportional to the difference between the measured vehicle acceleration and the expected acceleration based on (tqw_brk_pd−tqw_loss).

However, because conditions vary from nominal (e.g., road grade) and are transient, the algorithm may be modified as described below. In one example, when the driver is not braking, an offset between the effective net wheel torque from nominal calculations and the torque calculated based on vehicle acceleration is adaptively learned. When the brake is applied, that offset is considered to be constant (and not learned) and a wheel torque from the brakes is adaptively updated. While some delay timers and filtering may be used to address the lag in a filtered vehicle acceleration relative to tqw_brk and release of the brake pedal, other approaches could also be used. Also, since the transient relationships at lower vehicle speeds may reduce accuracy of the inferences, no learning (or reduced learning) may be done below a certain vehicle speed. The threshold value may be set at 20 mph, although it could be higher or lower, or adjusted as operating conditions change).

Referring now specifically to FIG. 3A, in step 310, the routine determines whether the brake pedal has been actuated by the vehicle driver. In particular, the routine determines whether the flag (biflg) is set to FALSE. In one embodiment, this flag may be set based on the brake pressure switch 142, although other sensors could be used, if desired. When the answer to step 310 is no, the routine resets the brake off timer (tqdec_brk_off_tmr) to zero in step 312. Alternatively, when the answer to step 310 is yes, this indicates that the brake is off, and the inferred brake effort is set to zero in step 314. Specifically, the parameter (tqw_inf_brk_effort) is set to zero. Then, the routine continues to step 316, to increment the brake off timer (tqdec_brk_off_tmr) based on the sample time (Δt). From step 316, the routine continues to step 318 where the net torque from the power train and the nominal losses are filtered with the rolling average function. For example, the routine filters estimated net torque from power train and nominal losses (tqw_brk–pd_tqw_loss) at a time constant of (tqw_net_inf_tc). Specifically, in step 318, the routine calculates a filtered net torque (tqw_net_filt) based on a rolling average of the difference between the power train brake torque and the nominal rolling losses with a time constant of (tqw_net_inf_tc) then the routine continues to step 320. Note that various other filtering approaches can be used if desired, such as, for example, higher order low pass filter, high pass filters, or combinations thereof.

In step 320, the routine determines whether the current vehicle speed is greater than a threshold value. Specifically, the routine determines whether the speed parameter (vspd) is greater than the threshold value (tqdec_inf_vspd_min). In answer to step 320, the routine continues to step 322 to determine whether the brake has been released for a minimum time. Specifically, the routine checks the brake off timer (tqdc_brk_off_tmr) to determine whether it is greater than the threshold (tqdc_brk_off_tm). The threshold can be a Cali ratable parameter which may be variable based on operating conditions. When the answer to step 322 is yes, the routine continues to step 324 to enable adaptive learning of the offset value, which can be indicative of the road grade or trailer towing loading.

In one example, when the brake has been released for a specified duration, the routine learns an instantaneous error (tqw_offset_err_tmp) attributed to the inferred offset (tqw_offset_inf) as:

$$tqw\_offset\_err\_tmp = tqw\_net\_filt\text{-}vs\_rate * pd\_acl\_2\_wtq - tqw\_offset\_inf.$$

$$tqw\_offset\_inf = tqw\_offset\_inf + tqw\_offset\_ki * delta\_sec\_tmp * tqw\_offset\_err\_tmp;$$

where vs_rate may be the rate of change of vehicle speed, pd_acl_2_wtq converts acceleration to wheel torque based on vehicle mass, tqw_offset_ki may be an adaptive gain, and delta_sec_tmp may be a sample time.

Alternatively, when the answer to step 322 is no, the routine continues to step 326 to determine whether the brake is applied by checking the flag (biflg). When the answer to step 326 is yes, the routine continues to step 328 to enable updating of the brake effort based on the calculated parameters listed below. In other words, when the brake is applied, the learning of the offset is skipped, and the brake effort is learned from the instantaneous error as:

$$tqw\_brk\_err\_tmp = tqw\_net\_filt\text{-}vs\_rate * pd\_acl\_2\_wtq - tqw\_offset\_inf - tqw\_inf\_brk\_effort.$$

$$tqw\_inf\_brk\_effort = f(tqw\_inf\_brk\_effort + tqw\_brk\_ki * delta\_sec\_tmp * tqw\_brk\_err\_tmp).$$

Where, tqw_brk_ki may be an adaptive learning gain, the function f may be a look-up table calabratable function.

From either step 328, 324 or a no in step 320 the routine ends.

Referring now to FIG. 3B in step 330, the routine determines whether a tip out condition is present. The tip out condition can be identified based on a closed accelerator pedal position, a rate of accelerator pedal closing, combinations thereof, or various other parameters. When the answer to step 330 is yes, the routine continues to step 332. In step 332, the routine reads the current inferred brake effort based on the equations indicated above. Note that when the updating of the brake effort in step 328 is bypassed via step 326, the brake effort is a substantially constant value for the case where a brake switch sensor is used.

Then, in step 334, the routine determines whether a tip out timer (which is incremented every sample time where a tip out conditions is present) is greater than a Cali ratable time (cal_time) or the brake effort (tqw_inf brk_effort) is greater than a first Cali ratable level (cal_level_1). The calibratable time (cal_time) can be a variable value that is adjusted based on vehicle speed and/or other operating conditions. In this way, if a driver's brake demand is above a certain level, deceleration fuel shut-off can be entered earlier than a timer would allow. As such, a more responsive engine braking can be provided, thereby reducing brake wear.

Note also, that in an alternative approach, the brake effort can be used as one criteria for changing from a small positive torque held by the power train to higher negative values that can then be used to trigger deceleration fuel shut off. Also note that additional conditions may also be included in step 334.

When the answer to step 334 is yes, the routine continues to step 336 to enable cylinder fuel cut-out conditions. Further, the inferred brake level can be used to set a desired negative engine brake torque level that is provided by varying a number of cylinders operating in the fuel cut state. For example, the number of cylinders with deactivated fuel injection can be a function of the inferred brake effort, thereby providing improved driver control of engine braking.

Then, step 338, the routine determines whether the brake effort is greater than the second calibratable level (cal_level_2). If not, the routine maintains a positive power train torque, which can be a small positive value maintained by maintaining torque converter speed to be at or slightly below torque converter input speed for an unlocked torque converter. In other examples, a desired engine torque is determined to maintain a slightly positive output power train torque. Alternatively, when the answer to step 338 is yes, the routine continues to step 342 to transition to negative power train torque. Then, in step 344 the routine adjust engine parameters to provide desired amount of engine braking torque.

In this way, for an example torque-based deceleration control strategy, if the driver has released the accelerator (gas) pedal and applied the brakes in a selected way (as compared to lightly tapping or resting the foot on the brake pedal), the system may transition from holding a small positive torque to an open-loop braking mode. In this way, the level of engine braking can follow the driver's demands. Also, if the driver is coasting (e.g., waiting for a stoplight to turn green ahead) where it is likely that the driver will tip-in again, the system can be configured to stay in the hold small positive mode to reduce the tendency for tip-in clunk on the ensuing tip-in.

Further, as noted above, the level of brake effort may also be incorporated into the decision whether to enter decal-fuel shutoff (or cylinder fuel-cut operation). For example, when the driver applies the brakes, an appropriately coordinated increase in engine braking may improve the deceleration of the vehicle, reduce required brake effort and wear (since the brakes have to do less work), and improve both measured and real world fuel economy (since less fuel is being wasted creating torque that is just cancelled by the brakes).

As such, FIG. 3 describes how brake effort can be used to determine when to transition the power train to provide negative power train torque. Further it illustrates how brake effort can be used to determine how much engine braking is used by varying the desired negative power train torque. It also describes how brake effort can be used to determine when to disable (and/or re-enable) fuel injection to one or more cylinders, as well as to determine how many cylinders to disable, thereby affecting engine brake torque levels. There are many other possible control system calculations and decisions that can be made based on a driver's level of brake effort.

FIGS. 4-7 show example algorithm performance via simulation analysis, where the driver's brake application is modeled as a wheel torque. On each plot, the modeled road grade, the inferred offset, the model's braking torque and the inferred braking torque are shown for comparison. The plots show the performance for level road and changing grades while trying to follow a FTP1372 drive cycle. Note that in this example no updates made to the estimated brake effort below 20 mph, denoted by a dashed line on each plot.

Figure 4:
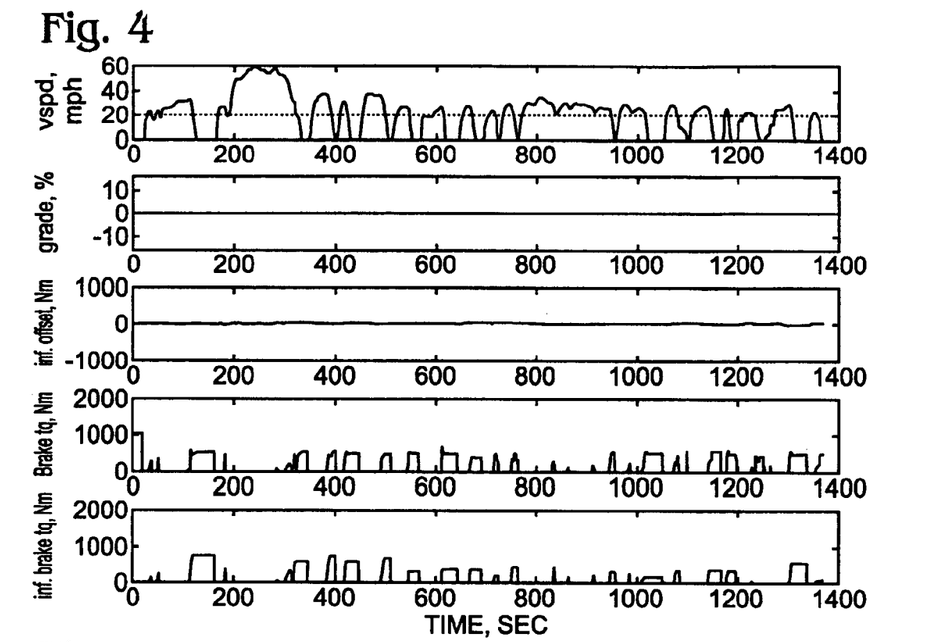
FIG. 4 shows inferred brake effort outputs for an FTP cycle on a level road.
Figure 5:
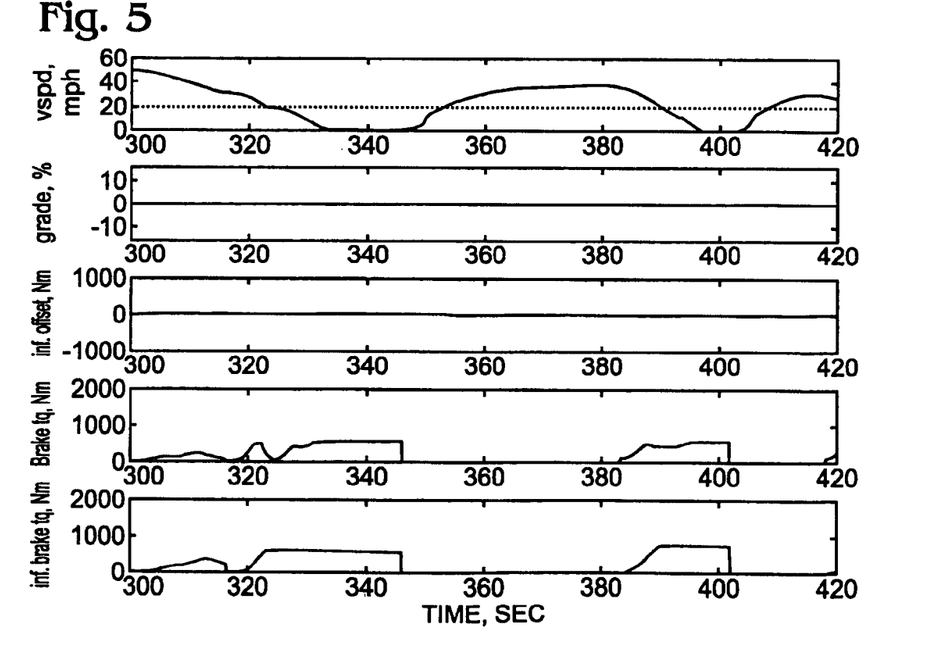
FIG. 5 shows a detailed view of inferred brake effort outputs on a level road.
Figure 6:
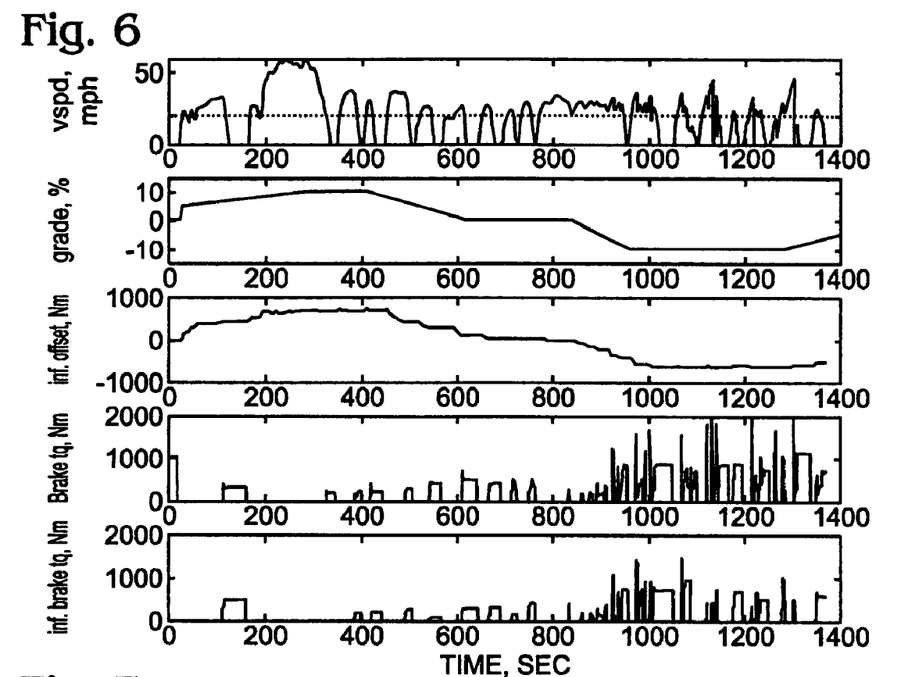
FIG. 6 shows inferred brake effort algorithm outputs for an FTP cycle with significant grades.
Figure 7:
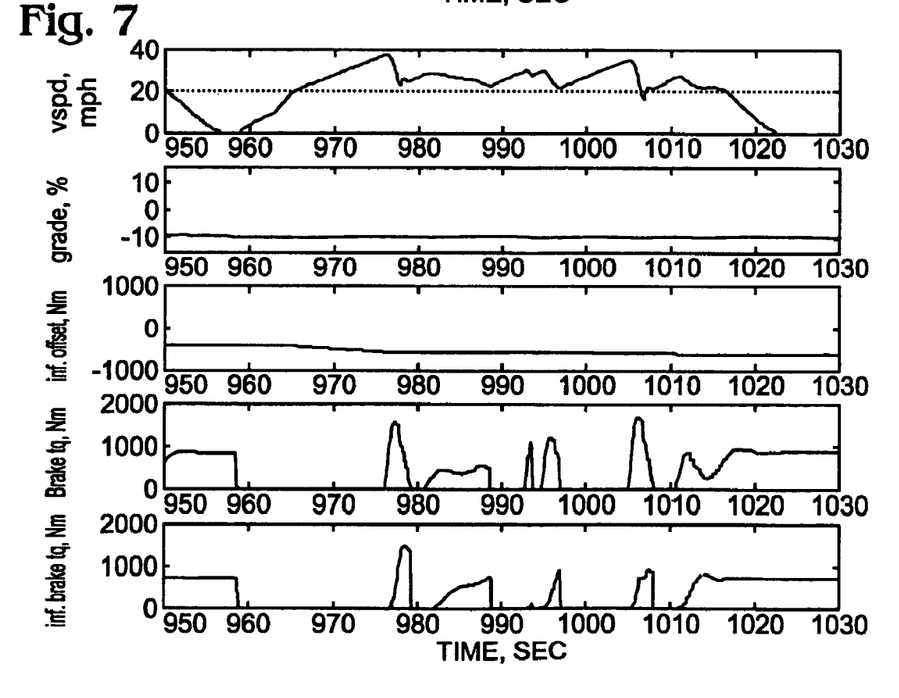
FIG. 7 shows a detailed view of inferred brake effort algorithm outputs on a downhill grade.

Specifically: FIG. 4 shows inferred brake effort outputs for an FTP cycle on a level road; FIG. 5 shows a detailed view of inferred brake effort outputs on a level road; FIG. 6 shows inferred brake effort algorithm outputs for an FTP cycle with significant grades; and FIG. 7 shows a detailed view of inferred brake effort algorithm outputs on a downhill grade.

The graphs illustrate that it is possible to provide an accurate estimate of brake effort according to the various example approaches listed above.

It will be appreciated that the configurations and routines disclosed herein are exemplary in nature, and that these specific embodiments are not to be considered in a limiting sense, because numerous variations are possible. For example, the above approach can be applied to V-6, I-4, I-6, V-12, opposed 4, and other engine types.

The subject matter of the present disclosure includes all novel and no obvious combinations and sub combinations of the various systems and configurations, and other features, functions, and/or properties disclosed herein. The following claims particularly point out certain combinations and sub combinations regarded as novel and no obvious. These claims may refer to "an" element or "a first" element or the equivalent thereof. Such claims should be understood to include incorporation of one or more such elements, neither requiring nor excluding two or more such elements. Other combinations and sub combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling an engine of a vehicle operated by a driver, the method comprising:
   detecting a level of actuation of a braking device of the vehicle by the driver, said detection distinguishing between at least a plurality of levels of brake engagement, each of said plurality of levels of brake engagement actuating the braking device to brake the vehicle; and
   reducing a number of cylinders carrying out combustion when said level of actuation above a threshold.

2. The method of claim 1 where said level of actuation of said braking device of the vehicle by the driver is an estimated braking level caused by the driver.

3. The method of claim 2 wherein said estimate is adaptively updated when vehicle speed is above a threshold speed, and slowing adaptive updating is used below said threshold.

4. The method of claim 1 wherein said reducing comprises enabling fuel injection cut operation based on said level of actuation.

5. The method of claim 1 wherein said reducing comprises varying a number of cylinders in which fuel injection is cut when said level of actuation is above a first threshold, the method further comprising transitioning from a positive powertrain output torque to a negative powertrain output torque when said level of actuation is above a second threshold.

6. The method of claim 1 wherein said reducing is performed if the driver has disengaged an accelerator pedal.

7. The method of claim 1 wherein said detecting said level of actuation comprises calculating a parameter indicative of an actual amount of braking effort by said driver based on vehicle conditions.

8. A method for controlling a powertrain of a vehicle operated by a driver, the method comprising:
   detecting a level of actuation of a braking device of the vehicle by the driver,
   said detection distinguishing between at least a plurality of levels of brake engagement, each of said plurality of levels of brake engagement actuating the braking device to brake the vehicle; and
   increasing engine braking by adjusting the powertrain to transition from providing positive torque driving the vehicle to negative torque braking the vehicle when said level of actuation increases above a threshold, and maintaining positive torque driving the vehicle when said level of actuation is below the threshold.

9. The method of claim 8 where said level of actuation of said braking device of the vehicle by the driver is an estimated braking level caused by the driver.

10. The method of claim 9 wherein said estimate is adaptively updated and an amount of adaptive updating is varied based on vehicle speed to provide reduced updating as vehicle speed decreases.

11. A computer readable storage medium having instructions programmed therein for controlling an engine of a vehicle operated by a driver, the medium comprising:
   instructions for detecting a level of actuation of a braking device of the vehicle by the driver, said detection distinguishing between at least a plurality of levels of brake engagement, each of said plurality of levels of brake engagement actuating the braking device to brake the vehicle;
   instructions for calculating a parameter indicative of an actual amount of braking effort by said driver based on vehicle conditions; and
   instructions for adjusting an engine operating parameter based on said parameter, wherein said instructions for adjusting said engine include changing a number of cylinders carrying out combustion: and wherein said instructions for adjusting said engine further includes reducing the number of cylinders carrying out combustion when said level of actuation is above a threshold, where said adjusting is performed if the driver has disengaged an accelerator pedal, said instructions distinguishing between braking actuation without accelerator pedal engagement and braking actuation after accelerator pedal engagement. and said adjusting is based on said distinguishing.

12. The computer readable storage medium of claim 11 wherein said instructions for adjusting said engine comprises enabling and disabling fuel cut operation.

13. The computer readable storage medium of claim 11 wherein said instructions for adjusting said engine comprises adjusting an engine braking level.

14. The computer readable storage medium of claim 11 wherein said instructions for adjusting said engine comprises adjusting an engine braking mode.

15. A method for controlling an engine of a vehicle operated by a
driver, the method comprising:
during a tip-out condition:
detecting a level of actuation of a braking device of the vehicle by the driver, said detection distinguishing between at least a plurality of levels of brake engagement, each of said plurality of levels of brake engagement actuating the braking device to brake the vehicle; and
reducing a number of cylinders carrying out combustion when said level of actuation is above a first threshold or a duration of the tip-out is greater than a first duration, where each of said level and the duration are considered; and
increasing engine braking by adjusting the powertrain to transition from providing positive torque driving the vehicle to negative torque braking the vehicle when said level of actuation increases above a second threshold, and maintaining positive torque driving the vehicle when said level of actuation is below the threshold.

* * * * *